United States Patent [19]
Anthony et al.

[11] Patent Number: 4,755,731
[45] Date of Patent: Jul. 5, 1988

[54] OPTICAL SCANNING TRANSDUCER

[75] Inventors: Donald C. Anthony, Tustin; Donald W. Niemand, Downey, both of Calif.

[73] Assignee: McDonnell Douglas Corporation, Long Beach, Calif.

[21] Appl. No.: 4,094

[22] Filed: Jan. 15, 1987

[51] Int. Cl.⁴ .............................. G05B 1/06
[52] U.S. Cl. .................. 318/662; 324/61 R; 361/290; 350/6.5; 350/6.7
[58] Field of Search ............... 318/662; 350/6.5–6.8, 350/6.91; 340/870.37; 361/290; 324/61 R

[56] References Cited

U.S. PATENT DOCUMENTS

| | | | |
|---|---|---|---|
| 1,520,329 | 12/1924 | Cherpeck | 361/290 |
| 2,744,220 | 5/1956 | Matteson | 361/290 |
| 3,845,377 | 10/1974 | Shimotori | 318/662 |
| 3,857,092 | 12/1974 | Meyer | 324/61 R |
| 4,092,579 | 5/1978 | Weit | 318/662 |
| 4,312,590 | 1/1982 | Harbaugh | 355/51 |
| 4,347,478 | 8/1982 | Heerens et al. | 324/61 R |
| 4,463,299 | 7/1984 | Langley et al. | 318/662 |

Primary Examiner—William M. Shoop, Jr.
Assistant Examiner—M. Bergmann
Attorney, Agent, or Firm—Benjamin Hudson, Jr.; George W. Finch; John P. Scholl

[57] ABSTRACT

There is provided an optical scanning apparatus having an angular positioning means that is generally comprised of a variable capacitor including a rotor disc with a plurality of equally spaced conductors and a stator disc with twice as many equally spaced conductors axially spaced from the rotor disc for capacitive coupling. Excitation of the variable capacitor provides a feedback signal to the controller of the optical scanning apparatus that is proportional to the angular position.

3 Claims, 2 Drawing Sheets

OPTICAL SCANNING TRANSDUCER

This invention relates generally to optical scanning transducers and more particularly to optical scanning transducers having angular positioning means.

In optical scanners that utilize the rotating mirrors connected to a drive motor, there is a stringent requirement for accurate detection of the position of the rotating mirror. This position information is fed back to the drive control circuitry for increasing the accuracy of control. Position detection techniques have been provided employing both variable inductive transducers and variable capacitive transducers. However, these forms of positioned detection have several drawbacks including complex circuitry and increased size.

It would be desirable if there were provided an optical scanner having an accurate position detector that has high acceleration capability and compact size.

SUMMARY OF THE INVENTION

There is provided by this invention an optical scanner comprised generally of a torque motor having a capacitive position sensor connected to the drive shaft of the torque motor for accurately measuring the position of an attached scanning mirror. The capacitive position sensor consists of a variable capacitor formed by two discs, a rotor and a stator, having wedge shaped conducting surfaces thereon providing axial capacitive coupling between the two parallel discs.

BRIEF DESCRIPTION OF THE PREFERRED EMBODIMENT

Figure 1:
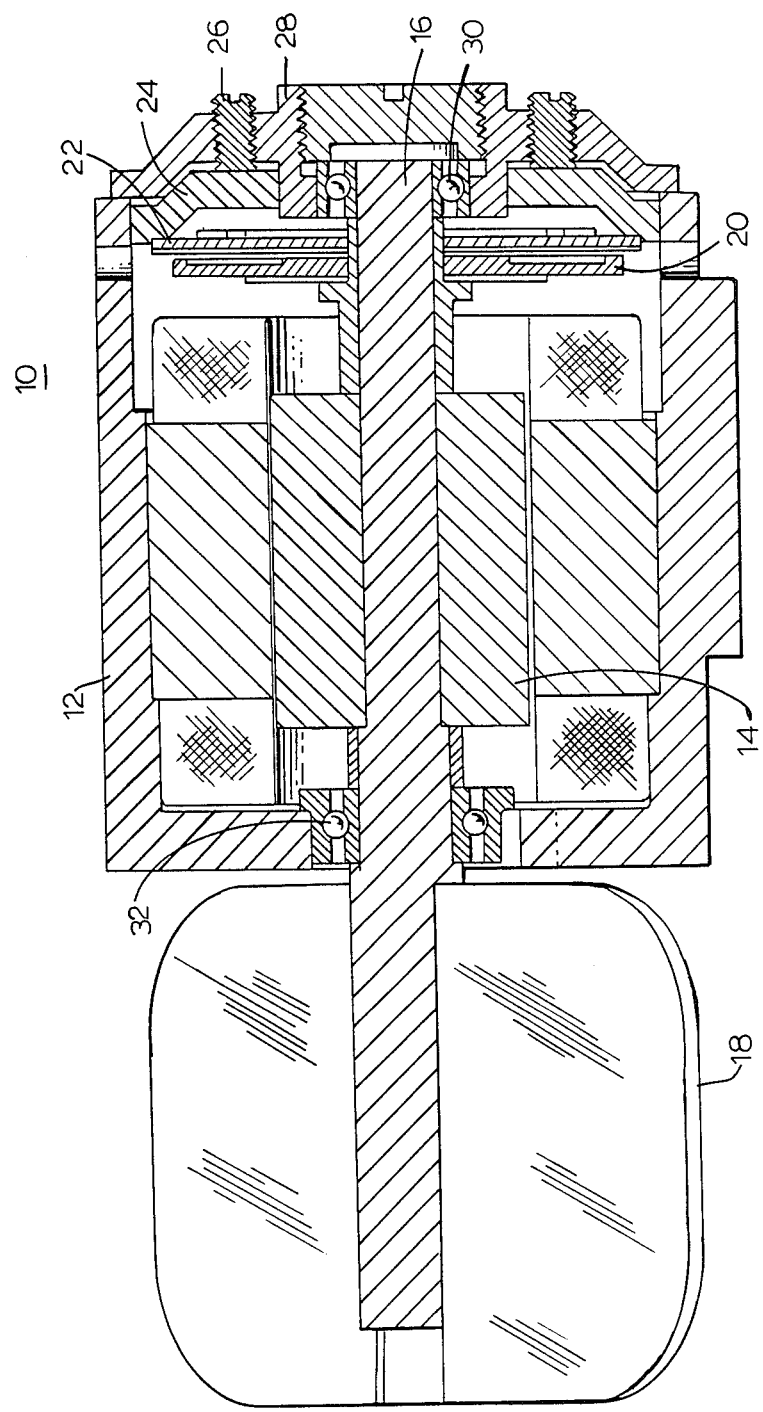
FIG. 1 is a sectional view of an optical scanner incorporating the principles of this invention.

Referring to FIG. 1 there is shown an optical scanning device 10 that incorporates the principles of this invention. The optical scanner is comprised of a housing 12 having mounted therein a torque motor 14. Attached to one end of the torque motor shaft 16 is a scanning mirror 18 that is disposed to reflect light in an optical scanning technique such as used in hard copy facsimile systems not shown but well known in the art. Also connected to the torque motor shaft 16 is a capacitive rotor disc 20 that rotates with the torque motor shaft 16. Axially spaced from the capacitor rotor disc 20 is a capacitive stator disc 22 that is connected within the housing 12. The capacitive rotor disc 20 and the capacitive stator disc 22 cooperate to form a capacitive position sensor in a manner hereinafter described. The capacitive stator disc 22 is connected to a support 24 that is adjustable within the housing 12 by means of set screws 26 to set the air gap between the rotor and stator for capacitive coupling. The housing 12 is sealed by an end plate 28. Two bearings 30 and 32 support the motor shaft within the housing 12. The torque motor may be a samarium cobalt magnet DC brushless motor.

Figure 2:
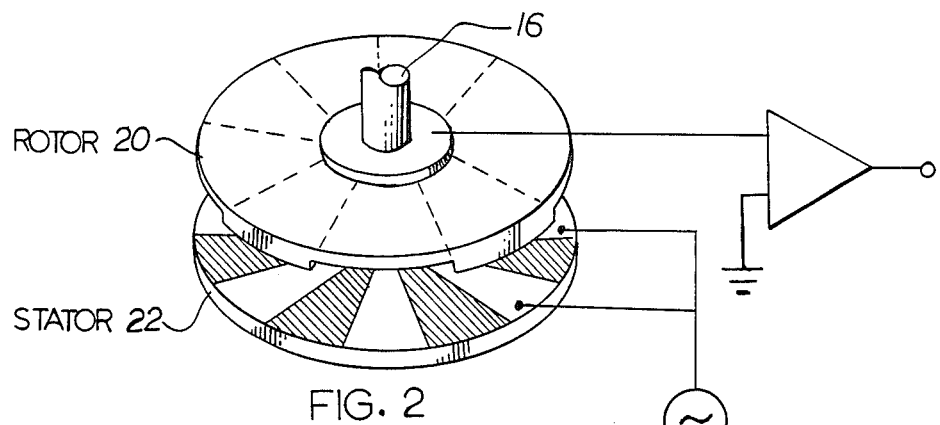
FIG. 2 is a perspective view of the capacitive position sensor employed in the optical scanner shown in FIG. 1.

Referring to FIG. 2, the variable capacitor is formed using two discs, rotor 20 and the stator 22. The discs are positioned parallel to each other with a small air gap. The rotor disc has one-half the number of wedge shaped conducting surfaces as the stator, each of which is opposite a portion of two wedge shaped conducting surfaces although this arrangement can be reversed. Thus a differential capacitive pair is formed. As the discs rotate with respect to each other, the single conductor is opposite a greater portion of one conducting surface and a lesser portion of the other of the capacitive pair, thus increasing the capacitance of one while decreasing the capacitance of the other.

Figure 3:
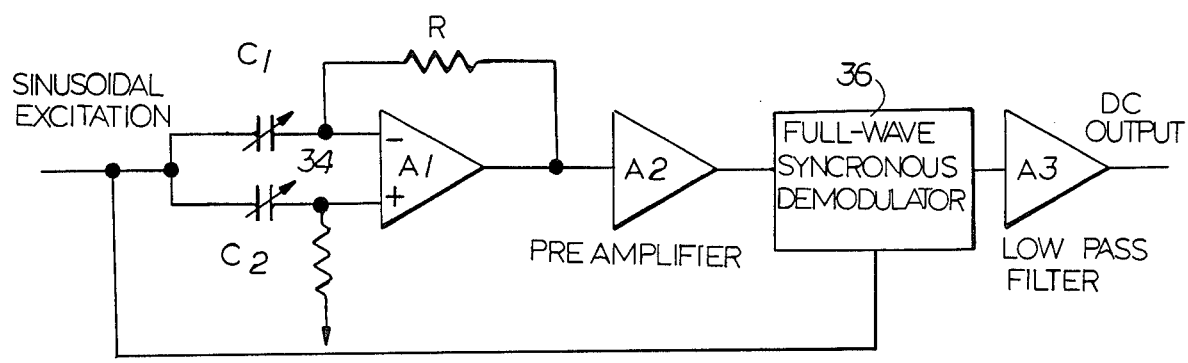
FIG. 3 illustrates the schematic for the capacitive position sensor utilized in FIG. 3.

As seen in FIG. 3 the difference in the capacitive coupling of the pair is measured in a bridge circuit 34. The variable capacitor input is a sinusoidal voltage. The bridge output varies proportionally in magnitude and polarity with the angular displacement from the balance capacitance or null position. The bridge output is amplified and passed to a full wave synchronous demodulator 36 which uses the capacitor excitation signal for reference. The demodulator output is low pass filtered for a DC output proportional in sign and polarity to the angular displacement of the disc from the null position. Every other wedge shaped conducting surface of the disc having a greater number of conducting surfaces is connected in parallel and all conducting surfaces of the other disc are connected in parallel resulting in the equivalent of the large pair of capacitors, C1 and C2. Increasing the number of wedge shaped conducting surfaces increases sensitivity while decreasing the range of the sensor. The discs are made of printed circuit boards or other insulators plated with a conducting surface. The discs having the lesser conducting surfaces can be formed from a single conducting surface such as aluminum or steel. Separation of the disc, and excitation amplitude and frequency are kept constant. To measure an angular displacement, the rotor disc is attached with axis aligned to the rotating element being measured. The stator disc is fixed to the reference with respect to which angle will be measured.

Figure 4:
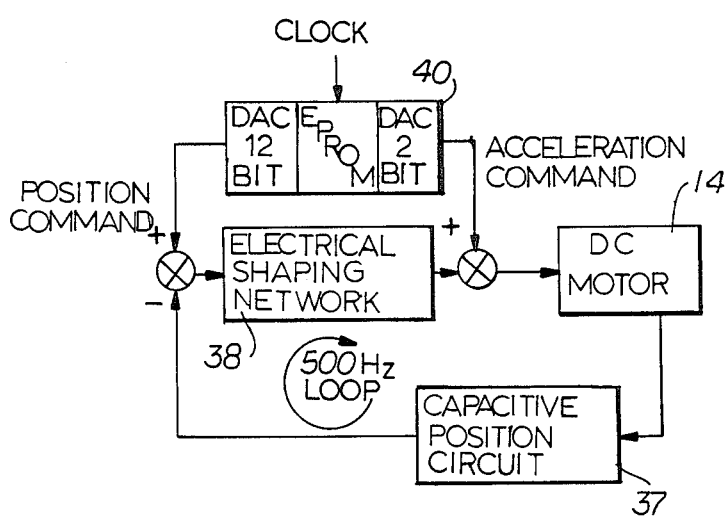
FIG. 4 illustrates the control circuitry for the optical scanner shown in FIG. 1.

The DC output is used for a positive feedback signal in the controller shown in FIG. 4 or it can be instrumented for a visual readout of angular position. The electronic circuit shown in FIG. 4 measures the mirror and motor shaft position as measured by the capacitive position sensor circuit 37 and is compared to the desired position. The error in position is electrically shaped by network 38 then used to drive the motor 14. Acceleration aiding is used to give the scanner exceptional dynamic response for following high acceleration scan trajectories. This feature involves adding an acceleration command to the shaped position error for driving the motor. A clock/memory/digital-to-analog converter function generator 40 outputs position and acceleration commands as programmed. A logic circuit allows frequency and amplitude of scan to be changed mid-scan.

This optical scanner employing the capacitive position sensor has advantages over potentiometer position sensors in the areas of friction and hysteresis. Rotary-variable differential transformers cost more and are larger having a greater amount of inertia and cannot achieve the band widths possible with the capacitive position sensor.

It can be readily seen that there is provided a novel optical scanner that employs a capacitive position sensor that utilizes a number of coplaner parallel capacitive conducting surfaces having an axial air gap. This results in a smaller flatter package.

Although there has been illustrated and described specific detail and structure of operation, it is clearly understood that the same were merely for purposes of illustration and that changes and modifications may be readily made therein by those skilled in the art without departing from the spirit and the scope of this invention.

We claim:

1. Optical scanning apparatus, comprising:
   (a) a drive means for driving an optical element configured to receive a radiated beam to be directed by the optical element;
   (b) programmable electrical circuit means for controlling the drive means to produce an angular displacement of the optical element;
   (c) angular capacitive positioning means coupled to the drive means for detecting the angular position of the optical element and generating a feedback output signal to the programmable electric circuit means that is proportional to the angular position;
   (d) the angular capacitive positioning means is generally comprised of a variable capacitor including:
   a capacitive rotor disc having a plurality of wedge shaped conducting surfaces equally spaced thereon and connected to the shaft of the dc motor generally perpendicular to the axis of rotation;
   a capacitive stator disc having twice as many equally spaced wedge shaped conducting surfaces as the rotor disc spaced axially parallel to the rotor disc and having an air gap therebetween for capacitive coupling;
   adjusting means for adjusting the air gap for changing the capacitive coupling of the variable capacitor; and
   programmable excitation means for providing a sinusoidal input voltage to the capacitive rotor and stator combination including a bridge circuit and synchronous demodulator for providing a DC output proportional in sign and polarity to the angular displacements of the discs from a null position.

2. An optical scanning apparatus as recited in claim 1 wherein the electric circuit means is generally comprised of:
   a clock/memory/didital-to-analog converter function generator programmable for position and acceleration commands;
   an electrical shaping network for driving the DC motor in response to the angular capacitive position sensor means; and
   a clock for changing the frequency and amplitude of the scan.

3. Angular capacitive positioning means, comprising:
   a capacitive rotor disc having a plurality of wedge shaped conducting surfaces equally spaced thereon and connected to an angular driving means generally perpendicular to the axis of rotation;
   a capacitive stator disc having twice as many equally spaced wedge shaped conducting surfaces as the rotor disc, spaced axially parallel to the rotor disc and having an air gap therebetween for capacitive coupling;
   adjusting means for adjusting the air gap for changing the capacitive coupling; and
   programmable excitation menas for providing a sinusoidal input voltage to the capacitive rotor and stator combination including a bridge circuit and synchronous demdulator for providing a DC output proportional in sign and polarity to the angular displacements of the discs from a null position.

* * * * *